US007112758B2

(12) United States Patent
Ma et al.

(10) Patent No.: US 7,112,758 B2

(45) Date of Patent: Sep. 26, 2006

(54) APPARATUS AND METHOD FOR SOLUTION PLASMA SPRAYING

(75) Inventors: Xinqing Ma, Storrs, CT (US); Stephen Murphy, Willimantic, CT (US); Jeffrey Roth, Coventry, CT (US); Danny Xiao, Willington, CT (US); Baki M. Cetegen, Glastonbury, CT (US)

(73) Assignees: The University of Connecticut, Storrs, CT (US); US Nanocorp, Inc., Farmington, CT (US); Inframat Corporation, Farmington, CT (US)

( * ) Notice: Subject to any disclaimer, the term of this patent is extended or adjusted under 35 U.S.C. 154(b) by 0 days.

(21) Appl. No.: 10/755,863

(22) Filed: Jan. 12, 2004

(65) Prior Publication Data

US 2004/0226508 A1 Nov. 18, 2004

Related U.S. Application Data

(60) Provisional application No. 60/439,397, filed on Jan. 10, 2003.

(51) Int. Cl.
*B23K 10/00* (2006.01)

(52) U.S. Cl. .......................... 219/121.47; 219/121.48; 219/76.16

(58) Field of Classification Search ........... 219/121.47, 219/76.15, 76.16, 121.48, 121.36; 118/715
See application file for complete search history.

(56) References Cited

U.S. PATENT DOCUMENTS 2,746,883 A 5/1956 Powers
4,603,568 A 8/1986 Siemers et al.
4,982,067 A 1/1991 Marantz et al. ........ 219/121.47
5,032,568 A 7/1991 Lau et al. ...................... 505/1
5,250,780 A 10/1993 Hansz et al.
5,421,895 A 6/1995 Tsubouchi et al. .......... 118/726
5,445,324 A * 8/1995 Berry et al. .................. 239/99
5,534,069 A * 7/1996 Kuwabara et al. .......... 118/719
5,609,921 A 3/1997 Gitzhofer et al. ........... 427/446
5,744,777 A 4/1998 Bernecki et al. ....... 219/121.47
5,858,470 A 1/1999 Bernecki et al. ............ 427/453
5,876,683 A 3/1999 Glumac et al. ............. 423/325
6,025,034 A 2/2000 Strutt et al. ................. 427/450
6,056,994 A 5/2000 Paz de Araujo et al.
6,132,653 A 10/2000 Hunt et al. ..................... 264/5
6,195,504 B1 2/2001 Horie et al. ................ 392/394
6,277,448 B1 8/2001 Strutt et al. ................. 427/452

(Continued)

FOREIGN PATENT DOCUMENTS

DE 1 281 769 10/1968

(Continued)

OTHER PUBLICATIONS

International Search Report Mailed on Dec. 29, 2004.

(Continued)

*Primary Examiner*—Mark Paschall
(74) *Attorney, Agent, or Firm*—Cantor Colburn LLP

(57) ABSTRACT

The apparatus for the thermal spray delivery of a precursor solution comprises a first solution reservoir, a second solution reservoir, singular or multiple atomizing liquid injector (s) disposed in fluid communication with the reservoirs, a flame source configured to direct a spray from the atomizing liquid injector to a substrate, and a thermal control device disposed in thermal communication with the substrate. The method of depositing a precursor solution at a substrate to form a coating comprises maintaining a substrate at a pre-selected temperature, delivering the precursor solution from a reservoir bank, atomizing the precursor solution, injecting the atomized precursor solution into a flame, and directing the flame to the substrate.

18 Claims, 6 Drawing Sheets

U.S. PATENT DOCUMENTS

| | | | | |
|---|---|---|---|---|
| 6,432,487 | B1 | 8/2002 | Graham et al. | 427/454 |
| 6,447,848 | B1 | 9/2002 | Chow et al. | 427/446 |
| 6,491,967 | B1 | 12/2002 | Corderman et al. | |
| 2002/0062789 | A1* | 5/2002 | Nguyen et al. | 118/715 |
| 2002/0113144 | A1* | 8/2002 | Huang et al. | 239/424.5 |
| 2002/0182324 | A1 | 12/2002 | Kaneko et al. | |
| 2003/0031806 | A1* | 2/2003 | Jinks | 427/569 |

FOREIGN PATENT DOCUMENTS

| | | |
|---|---|---|
| DE | 19958473 A1 | 7/2001 |
| FR | 1412272 | 10/1963 |
| FR | 1393487 | 2/1965 |
| GB | 2100621 | 6/1981 |
| WO | WO 97/05994 | 2/1997 |
| WO | WO 98/41316 | 9/1998 |
| WO | WO 00/00660 | 1/2000 |

OTHER PUBLICATIONS

Written Opinion of the International Searching Authority. International Application No. PCT/US2004/000629.

Bouyer, et al. "Characterization of SiC and Si3N4 coatings synthesized by means of Inductive thermal plasma from disilane precursors". Applied Organometallic Chemistry, Appl. Organometal. Chem. 2001; 15: 833-840.

Delbos, et al. "Plasma Spray Elaboration of Finely Structured YSZ Thin Coating by Liquid Suspension Injection". Thermal Spray 2003: Advancing the Science & Applying the Technology, (Ed.) C. Moreau and B. Marple, Published by ASM International, Materials Park, Ohio, USA, 2003. pp. 661-669.

Devi, et al., "Comparison of citrate-nitrate gel combustion and precursor plasma spray processes for the synthesis of yttrium aluminum garnet". J. Mater. Res., vol. 17, No. 11, Nov. 2002. pp. 2846-2851.

Davi, et al. "Single-step deposition of Eu-doped Y203 phosphor coatings through a precursor plasma spraying technique". J. Mater. Res., vol. 17, No. 11, Nov. 2002. pp. 2771-2774.

Karthikeyan et al., "Preparation of Nanophase Materials by Thermal Spray Processing of Liquid Precursors". NanoStructured Materials, vol. 9, pp. 137-140. 1997.

Karthikeyan, et al. "nanomaterial Deposits Formed by DC Plasma Spraying of Liquid Feedstocks". J. Am. Ceram. Soc., 81 (1) 121-128 (1998).

Karthikeyan, et al. "Nanomaterial Powders and Deposits Prepared by Flame Spray Processing of Liquid Precursors". NanoStructured Materials, vol. 8, No. 1, pp. 61-74, 1997.

Ma, et al. "Intermediate Temperature SOFC Based on Fully Integrated Plasma Sprayed Components". 6 pages.

Ma, et al. "Study of Unique Microstructrure in SPS Ceramic NanoCoatings". 6 pages.

Padture, et al. "Towards Durable Thermal Barrier Coatings with Novel Microstructures Deposited by Solution-Precursor Plasma Spray". Acta mater. 49 (2001) 2251-2257.

Su, et al. "In Situ Characterization of Small-Particle Plasma Sprayed Powders". Journal of Thermal Spray Technology vol. 11 (1) Mar. 2002 pp. 52-61.

Parukuttyamma, et al. "Yttrium Aluminum Garnet (YAG) Films through a Precursor Plasma Spraying Technique". J. Am. Ceram. Soc., 84 (8) 1906-1908 (2001).

Tikkanen, et al. "Characteristics of the liquid flame spray process". Surface and Coatings Technology 90 (1997) 210-216.

Schlichting, "Failure Modes in Plasma-Sprayed Thermal Barrier Coatings" University of Connecticut, (2000) 186 pages.

* cited by examiner

APPARATUS AND METHOD FOR SOLUTION PLASMA SPRAYING

CROSS REFERENCE TO RELATED APPLICATIONS

This application claims priority to Provisional Application Ser. No. 60/439,397 filed on Jan. 10, 2003, which is herein incorporated by reference.

STATEMENT OF GOVERNMENT INTEREST

This invention was made with Government support under contracts N-00014-02-10171 and N-00014-98-C-0010 awarded by the Office of Navel Research. The Government has certain rights in the invention.

BACKGROUND

This disclosure relates to an apparatus used during thermal spray operations, and, more particularly, to an apparatus for the continuous and stable delivery, atomization, and injection of solution for producing films, coatings, or bulk forms in a solution thermal spray process such that the desired microstructural features of the films, coatings, or bulk forms are obtained upon application. The invention also particularly relates to the control of the temperature of the substrate at which the films, coatings, or bulk forms are formed or deposited.

In thermal spray processes, particles of metallic, composite, or ceramic materials are at least partially melted, accelerated, and impinged onto a target substrate to produce a coating having anti-corrosion, anti-wear, thermal insulation or other functional properties. The coating is thickened and built up through the continuous overlaying of material in the form of droplets to produce a coating having splat/lamellar boundary features and partially melted and/or unmelted particle inclusions. The lamellar structure of such coatings, because of their low tolerance to thermal stress induced during thermal cycling in the service environment, may be considered a disadvantage for certain applications, particularly in thermal barrier coating (TBC) applications.

Although the deposited coatings typically derive from solid material, liquid precursors comprising aqueous solutions of metal salts, metal-organic salt solutions, or polymer-based solutions may also be utilized as feedstock sources to produce coatings, particularly when the thermal spray process is a plasma spray process.

The above discussed and other features will be appreciated and understood by those skilled in the art from the following detailed description and drawings.

SUMMARY

Disclosed herein is an apparatus for the thermal spray delivery of a precursor solution and a method of depositing the precursor solution at a temperature controlled substrate to form a film, coating, or preform. The apparatus comprises at least one solution reservoir, a coolant reservoir, flow control unit, liquid mixing unit, cooling and purge unit, pressure and flow control, at least one atomizing liquid injector disposed in fluid communication with the reservoirs, a flame source configured to direct a spray from the atomizing anti-fouling liquid injector to a temperature controlled substrate, and a thermal control device disposed in thermal communication with the substrate. The method comprises maintaining a substrate at a pre-selected temperature, delivering the precursor solution from a reservoir bank, generating a liquid stream or atomizing the precursor solution, injecting the atomized precursor solution into a flame, and directing the flame to the substrate. This apparatus provides for continuous and stable delivery, atomization, and injection of solution for producing films, coatings, or bulk forms of single, multiple, or graded constituents.

BRIEF DESCRIPTION OF THE FIGURES

Referring now to the drawings wherein like elements are numbered alike in several Figures.

DETAILED DESCRIPTION

Figure 1:
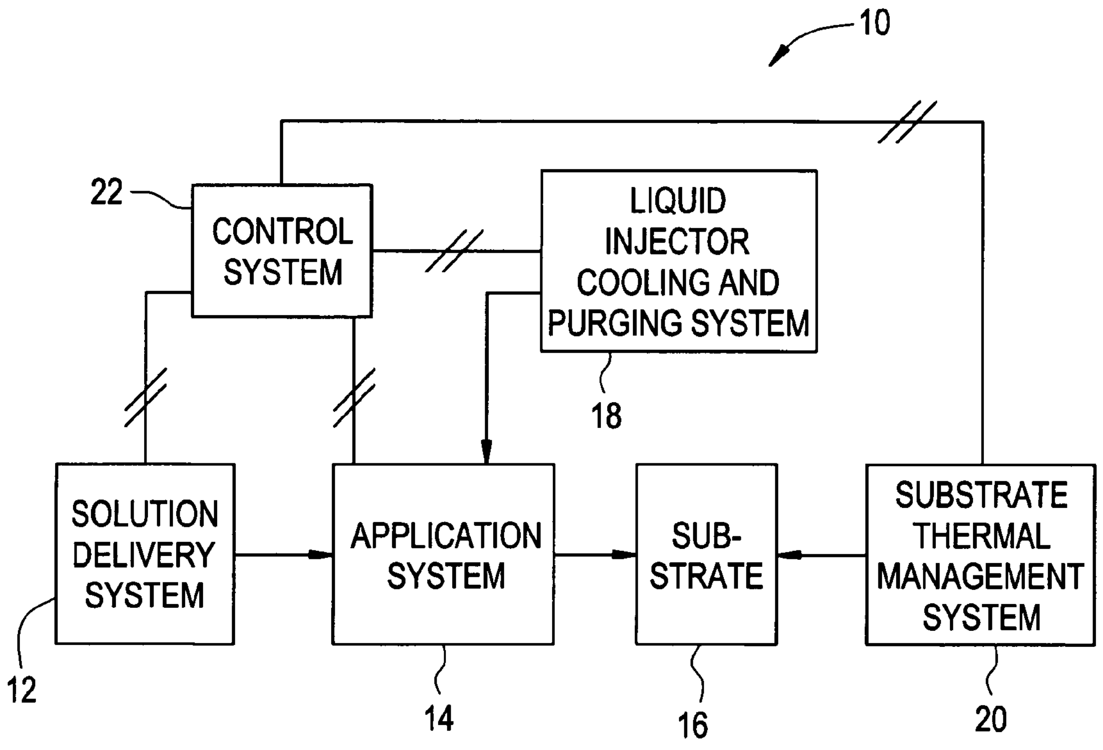
FIG. 1 is a schematic representation of an apparatus for the plasma spray of a solution.

Disclosed herein is a thermal spray process and an apparatus used for the delivery of a solution (e.g., a precursor solution) to produce a coating, film, or bulk form (hereinafter "coating") to a temperature-controlled substrate. In the thermal spray process of applying the coatings from liquid precursor solutions, four steps are preferably involved: (1) preparation of the precursor solution; (2) delivery of the precursor solution; and (3) conversion of the precursor solution into a solid material in a pyrolysis reaction and (4) deposition of the solid material on a target substrate to form a coating, film or bulk form. Delivery of the solution typically comprises spraying of the solution into a flame directed at the substrate. The substrate is temperature controlled and may be heated, cooled or neither heated nor cooled. Conversion of the solution typically comprises the pyrolitic reaction of the sprayed precursor solution producing a coating having the desired microstructure.

The precursor solution comprises at least one precursor dissolved in a solvent or combination of solvents. The precursor may comprise a liquid or a solid such a precursor salt. Exemplary salts include, but are not limited to, carboxylate salts, acetate salts, nitrate salts, chloride salts, alkoxide salts, butoxide salts and the like, combinations comprising one or more of the foregoing salts, alkali metals, alkaline earth metals, transition metals, rare earth metals and the like, and combinations comprising one or more of the foregoing metals, as well as combinations of the foregoing salts and metals. Preferred precursor salts include, for example, zirconium acetate, yttrium nitrate, aluminum nitrate, nickel nitrate, cerium acetate, lanthanum acetate, iron nitrate, zinc nitrate, and combinations comprising one or more of the foregoing salts.

Exemplary solvents in which the salts may be dissolved include, but are not limited to, water, alcohols, acetone, methyl ethyl ketone, carboxylic acids, organic solvents, and combinations of the foregoing solvents, and the like. In the case of complex compounds such as mixed oxide ceramics, the reagents are weighed according to the desired stoichiometry of the final compound, i.e., according to the desired stoichiometry of the mixed oxide, and then added and mixed to form the solution. The precursor solution may be heated and stirred to dissolve the solid components and homogenize the solution. Reagent grade precursors may be suitable for the manufacture of the films and coatings, particularly for doped semiconductors or oxide membranes used as electronic components, electrodes, or electrolytes. Industrial grade precursors may be preferred for the manufacture of structural thick coatings or bulk forms due to the lower cost of the starting chemicals. For the fabrication of composite or graded coatings, two or more different precursor solutions may be prepared and stored in individual containers. The substrate surface is preferably treated via a grit-blasting process if it does not comprise a bond coat and rinsed with a solvent prior to its coating in order to provide an anchor profile for the coating, thereby minimizing the potential for thermal fatigue induced spalling and delamination.

The apparatus for the deposition a microstructured coating comprises a means for delivery of a solution comprising a precursor, a means for injecting the solution comprising a precursor into a thermal spray flame, a means for thermal spraying the injected solution comprising a precursor to convert the precursor to at least partially melted pyrolized particles and non-liquid material and directing the at least partially melted pyrolized particles and non-liquid material to the target substrate, and a means for monitoring and controlling the temperature of the substrate to which the flame is directed. The process by which the material(s) are ultimately deposited on the substrate to form the coating comprises a thermal spray process and, more preferably, a plasma spray process.

A precursor solution thermal spray process comprises forming precursor solution droplets; injecting precursor solution droplets into a thermal spray flame wherein a first portion of the precursor solution droplets are injected into a hot zone of the flame and a second portion of the precursor solution droplets are injected into a cool zone of the flame; fragmenting the droplets of the first portion to form reduced size droplets and pyrolizing the reduced size droplets to form pyrolized particles in the hot zone. The pyrolized particles are at least partially melting in the hot zone and deposited on a temperature controlled substrate. The second portion of precursor solution droplets are fragmented to form smaller droplets and converted to non-liquid material from the smaller droplets in the cool zone. The non liquid material is also deposited on the temperature controlled substrate. As readily understood by one of ordinary skill in the art, the terms first portion and second portion do not imply a sequential order but are merely used to differentiate the two portions.

Without being bound by theory it is believed that non-liquid material formed in the cool zone contributes to the creation of microstructural features such as porosity, vertical cracks, and inter pass boundaries. Microstructural features refer to structural features on a microscopic level. Non-liquid material includes both solid and gel-like materials and is, at most, only partially pyrolized and may be completely unpyrolized. The volume contraction that occurs in the material when the trapped residual liquid is heated and the non-liquid material undergoes crystallization contributes, along with the thermal expansion mismatch between the coating and the underlying substrate, to the formation of vertical cracks. Additionally, volume contraction contributes to the formation of porosity.

A thermal spray flame typically has at least two zones based on the flame temperature range: the hot zone which has a temperature greater than or equal to the pyrolization temperature of the precursor salt, and the cool zone which has a temperature less than the pyrolization temperature of the precursor salt. When the precursor solution comprises more than one precursor salt the lowest pyrolization temperature determines the size/location of the flame zones. Controlling the location of injection and droplet momentum are required to ensure the desired amount of the droplets penetrate the hot zone for fragmentation and subsequent pyrolysis. Pyrolysis is defined herein as the conversion of the precursor to the desired material without substantial degradation. Precursor solution injection may be radial or coaxial into the hot zone.

Referring to FIG. 1, a schematic representation of the apparatus for the thermal spray of the precursor solution onto a substrate is shown at 10 and is hereinafter referred to as "apparatus 10." Apparatus 10 provides for the delivery of one or more solutions comprising a precursor to a thermal spray flame, the conversion of the precursor to at least partially melted pyrolyzed particles and non-liquid material and delivery of the at least partially melted pyrolyzed particles and non-liquid material to a substrate to form the desired coating on the substrate. Apparatus 10 comprises various systems, viz. a solution delivery system 12, an application system 14 configured to receive the precursor solutions from delivery system 12 and apply the solutions to the workpiece target substrate, shown at 16, a liquid injector cooling and purging system 18, and a substrate thermal management system 20 configured to provide thermal control to substrate 16 at which the at least partially melted pyrolized particles and non-liquid material formed from the precursors are deposited to form the desired coating. Apparatus 10 further preferably comprises a control system 22 disposed in communication with the various systems 12, 14, 18, 20 to provide closed loop control of apparatus 10.

The closed loop control of apparatus 10 is preferably maintained via various pressure-, temperature-, and flow sensor/transmitters. Such sensor/transmitters may be incorporated into apparatus 10 to monitor their respective process parameters and to transmit their respective signals to a transducer disposed in control communication with an operator interface device (e.g., a computer). Pressure sensor/transmitters can be any suitable quantitative sensing devices that convert the pressure measured at points of the various systems 12, 14, 18, 20 to signals transmittable back to the transducer. Similarly, the temperature- and flow sensor/transmitters can be suitable quantitative devices that convert their respective parameters to signals that can be transmitted back to the transducer and utilized to control the relevant parameters of the operation of apparatus 10. The transducer may be any suitable converting device such as an analog circuit, a digital microprocessor, or the like.

Figure 2:
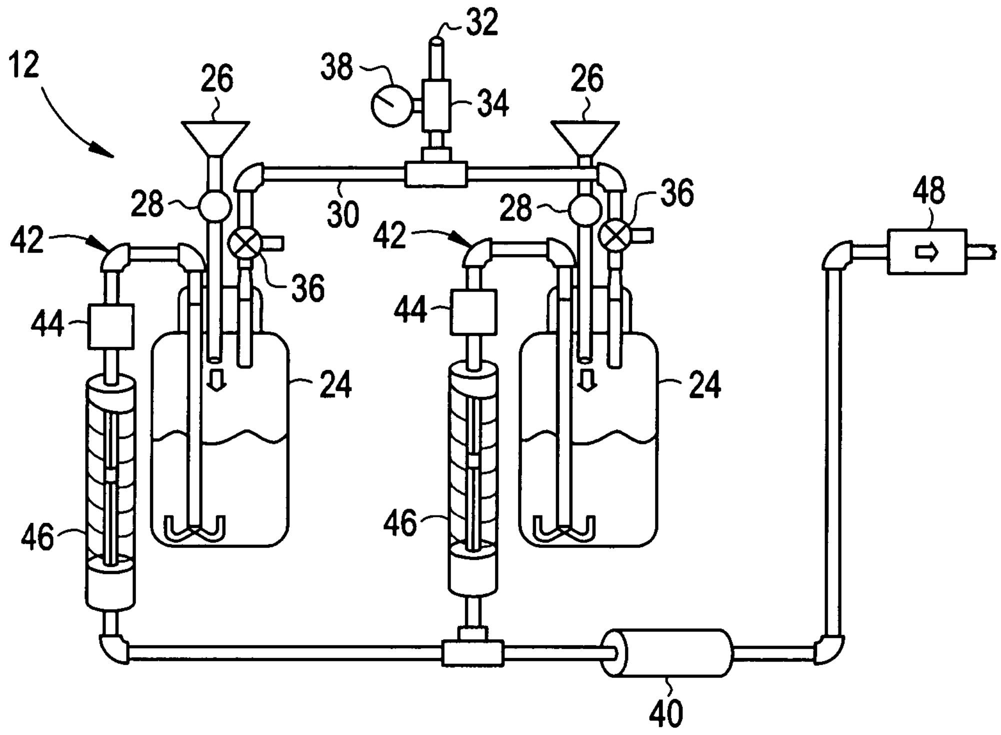
FIG. 2 is schematic representation of a solution delivery system of an apparatus for a plasma spray operation.

Referring now to FIG. 2, solution delivery system 12 is shown in greater detail. Solution delivery system 12 provides for the transfer of solution precursor to the application system for the subsequent thermal spraying of the precursor. Solution delivery system 12 comprises reservoirs 24 disposed in controlled fluid communication with each other and with the application system. Each reservoir 24 may be filled with the same precursor solution, or they may be filled with different solutions. When two or more reservoirs 24 are arranged in a bank and utilized for delivery of a single solution, a continuous and stable liquid delivery by alternating use of reservoirs 24 is effected. Alternatively, two or more reservoirs 24 may be arranged a bank for the delivery of multiple solutions comprising two or more different precursors for the formation of a composite, gradient or layered coating. Although only two reservoirs 24 are shown, it should be understood that any number of reservoirs may be disposed in controlled fluid communication with each other and with the application system.

In one exemplary embodiment of solution delivery system 12, precursor solutions are delivered to reservoirs 24 by gravity feed through funnels 26 disposed at an upper end of each reservoir 24. Alternately, reservoirs 24 may be fed via feed lines through which the precursor solutions are pumped or otherwise made to flow. Such feed lines, as well as any lines that provide fluid communication between the various components of the apparatus, are preferably compatible with the fluids flowing therethrough. Valves 28 may be disposed to intermediate funnels 26 and reservoirs 24 to facilitate the control and shut off of solution flow to reservoirs 24.

Reservoirs 24 may be disposed in controlled fluid communication with each other through a common line 30, which may comprise a manifold, a pipe, a tube, or a similar device. Common line 30 comprises an inlet 32, a pressure sensor/transmitter 34 disposed at inlet 32, and valves 36 disposed at the inlets of each respective reservoir 24. Inlet 32 is configured to receive a pressurized gas from a supply (not shown), which is preferably utilized to provide the driving force for the precursor solution to the application system. Exemplary pressurized gases that may be utilized to drive the precursor solutions include, but are not limited to, air, nitrogen, argon and the like. Reservoirs 24 are pressurized to about 5 pounds per square inch (psi) to about 80 psi, and more preferably about 20 psi to about 50 psi, and even more preferably to about 40 psi to provide the driving force. The pressure may be manually monitored by an operator of the system via a pressure gauge 38 and controlled via the communication of a pressure signal from pressure sensor/transmitter 34 to the control system, which in turn provides an actuation signal to the pertinent valve 36. Valves 36 are preferably three-way valves controllable in response to pressure variations in common line 30 such that excess pressure can be relieved through any one or a combination of valves 30 to provide constant pressure to reservoirs 24 and delivery of the precursor solution therefrom. Alternatively, other type of liquid delivery devices like mechanical pump can be used to delivery the solution precursor from the reservoirs 24 to outlet line 42.

Each reservoir 24 is disposed in fluid communication with a mixer 40 through corresponding outlet lines 42 that meet at an outlet junction. Each outlet line 42 is preferably disposed in fluid communication with the precursor solution of its corresponding reservoir 24 through a siphon tube. Each outlet line 42 preferably comprises a corresponding valve 44 (e.g., a needle valve) and a corresponding flowmeter/transmitter 46. The flowmeter portion of each flowmeter/transmitter 46 may comprise a rotameter, as is shown. The transmitter portion of each flowmeter/transmitter 46 is disposed in communication with the control system, which in turn may provide control of needle valves 44 to regulate the flow from each reservoir 24. The outlets of each flowmeter/transmitter 46 are disposed in fluid communication with mixer 40, which is preferably a vessel comprising a series of baffles arranged within a shell to facilitate the bulk mixing of the precursor solutions from each reservoir 24. A check valve 48 may be disposed at the outlet of mixer 40 to prevent the backflow of fluid from the application system.

Figure 3:
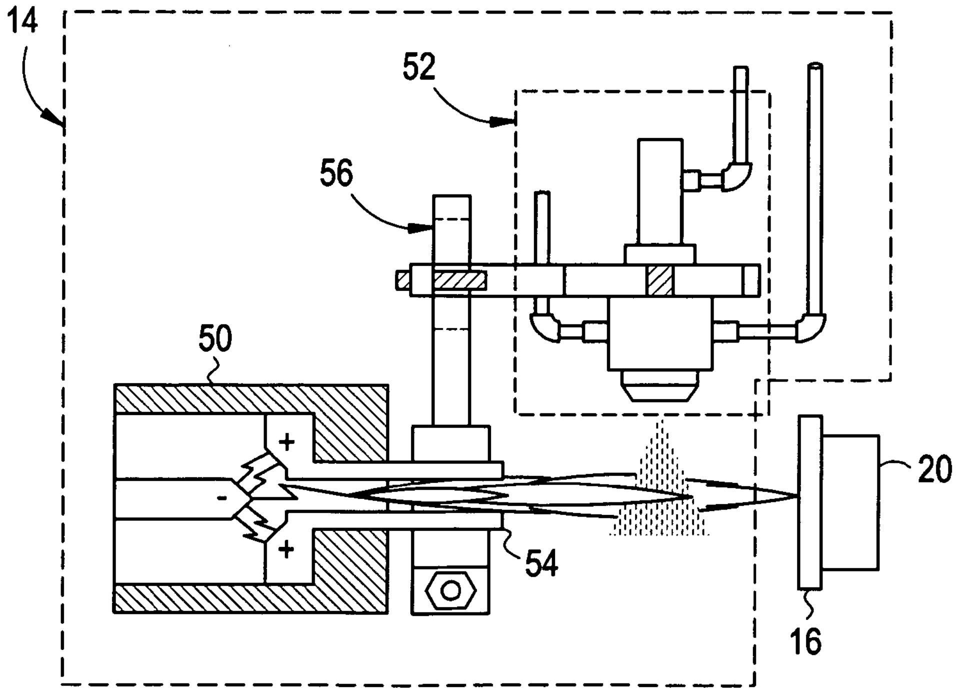
FIG. 3 is a schematic representation of an application system of an apparatus for a plasma spray operation.

In FIG. 3, application system 14, substrate 16, and substrate thermal management system 20 are shown. As stated above, application system 14 preferably comprises a thermal spray apparatus and more preferably comprises a plasma spray apparatus. The plasma spray apparatus preferably comprises a plasma gun 50 arranged to receive precursor solution from a liquid injector 52, preferably an atomized spray of precursor solution from a single or multiple atomizing liquid injector(s), disposed in fluid communication with the solution delivery system. Plasma gun 50 provides a flame from the arc ignition of primary and /or secondary gases, which is directed from an anode nozzle 54 to substrate 16. The primary gas may be either argon or nitrogen, and the secondary gas may be either hydrogen or helium. Although the plasma can be generated from the primary gas alone, the secondary gas provides additional power to the plasma and increases the plasma enthalpy for higher flame temperature. The liquid injector 52 is not limited to an atomizing injector and can be a direct liquid injection nozzle or piezo electric crystal induced liquid injector.

The atomized precursor solution is sprayed into the flame from anode nozzle 54 via liquid injector 52 disposed at plasma gun 50. Liquid injector 52 is preferably disposed external to plasma gun 50 as shown to direct the spray radially into the flame. Alternately, injector 52 may be internally disposed within plasma gun 50 to direct the precursor solution almost axially in the flame. Liquid injector 52 is configured to be adjustably positionable at the flame via a support 56 that can be adjusted in the perpendicular and horizontal directions to the plasma to retain injector 52 in a desired position.

Figure 4:
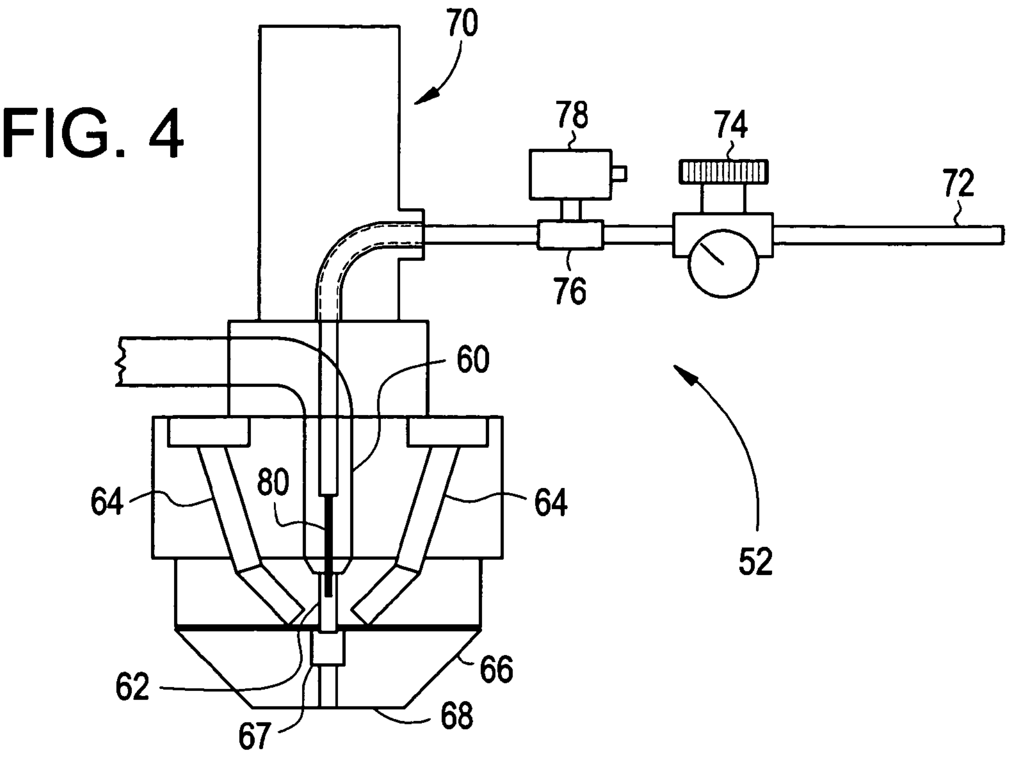
FIG. 4 is a cross sectional representation of an atomizing liquid injector.

In the exemplary embodiment of atomizing liquid injector 52 shown in FIG. 4 in which atomizing liquid injector 52 is external to the plasma gun, atomizing liquid injector 52 comprises a solution channel 60 from which the precursor solutions are received from the solution delivery system, an injector nozzle 62 axially disposed at solution channel 60, and at least one atomizing gas channel 64 disposed adjacent to injector nozzle 62. Preferably, the pressure of the atomizing gas delivered through atomizing gas channel 64 is equal to the pressure at which the precursor solution is delivered, which is preferably about 5 psi to about 80 psi, more preferably about 20 psi to about 50 psi, and even more preferably about 40 psi. Such pressures, in conjunction with the configuration of the outlet of air cap 66, provide delivery of droplets that are about 10 micrometers (μm) to about 50 μm.

Air cap 66 may be disposed over injector nozzle 62. Preferably, air cap 66 includes an air-precursor solution atomizing chamber 67, an air cap exit nozzle 68 through which the atomized precursor solution is directed. An outlet of the air cap exit nozzle 68 may be configured to include an opening of any one of a variety of orientations (e.g., angular, elliptical, round, any combination thereof, and the like) to provide for various spray patterns. Preferably, the outlet of air cap exit nozzle 68 has a shape, dimension, and angle such that the atomized precursor solution spray corresponds to the dimensions of the plasma flame to obtain a consistent and efficient feed of solution into the flame. The air cap design 66 is configured to preclude fouling. Atomization of the precursor solution into fog droplets is provided by the pressure of the solution delivered from the reservoirs, the pressure of the atomizing gas received through atomizing gas channel 64, and the configuration of air cap nozzle 68. Air cap 66 is also preferably perpendicularly oriented relative to the directed flow of atomized precursor solution so as to minimize the accumulation of residue at the air cap exit nozzle 68. A cleaning assembly 70 disposed in fluid communication with solution channel 60 may be disposed at atomizing liquid injector 52 to provide for the periodic purging of the precursor solution from injector nozzle 62. Cleaning assembly 70 comprises an air inlet 72, a pressure regulator 74 for regulating the line pressure of the air into atomizing liquid injector 52, and a valve 76 (e.g., a solenoid valve) through which the flow of air can be controlled. Regulation of the line pressure and the air flow through valve 76 may be controlled through the control system. Valve 76 also may include a timer 78 to provide for the cyclical automatic actuation of cleaning assembly 70. A pin 80 may be axially disposed at or in solution channel 60 and injector nozzle 62 to direct the flow of precursor solution through injector nozzle 62. The air received into pressure regulator 74 is preferably filtered.

Figure 5:
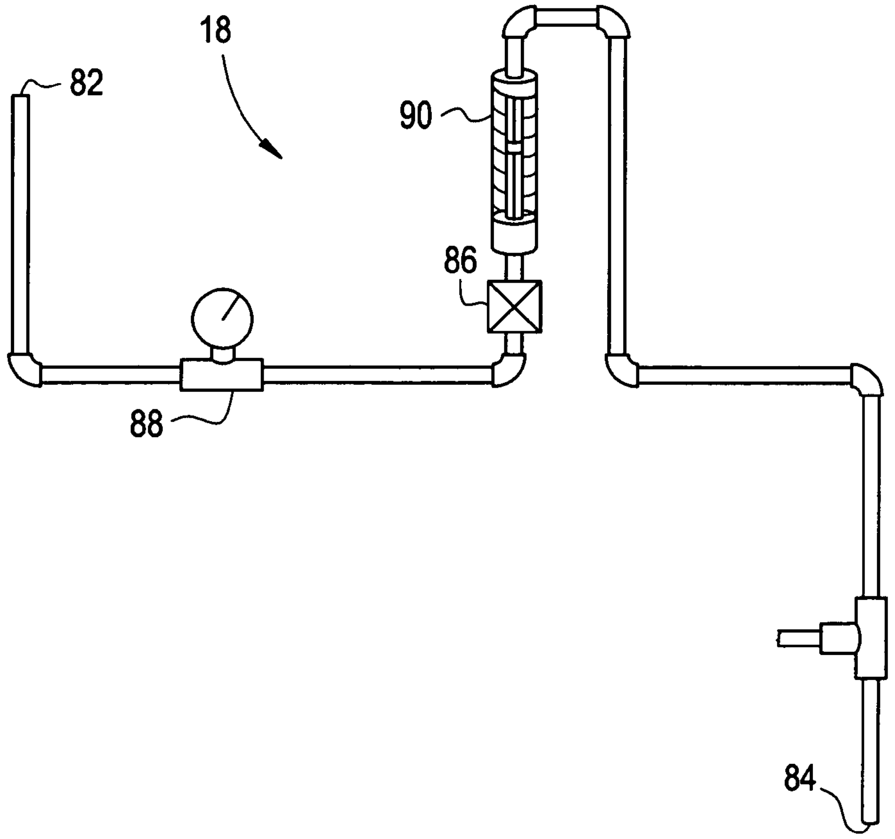
FIG. 5 is a schematic representation of a injection cooling system of an apparatus for a plasma spray operation.

Referring now to FIG. 5, liquid injector cooling and purging system 18 is shown. Liquid injector cooling and purging system 18 comprises an inlet 82 through which a fluid (e.g., water) is received and an outlet 84 disposed at the atomizing liquid injector through which the fluid cools the injector/air cap system during preheating of the substrate. Moreover, system 18 is used to purge the liquid injector/air cap system after thermal spraying to clean the system for subsequent use. Fluid flow through substrate cooling system 18 is preferably regulated by a valve 86 (e.g., a needle valve) in response to the pressure in the line as sensed by a pressure sensor/transmitter 88 and transmitted to the control system. A flowmeter 90 (e.g., a rotameter) may be provided to monitor the flow through the liquid injector cooling and purging system 18. Injector cooling and purging system 18 may further comprise a shutoff valve, a check valve to prevent the backflow of fluid, and a filter.

Figure 6:
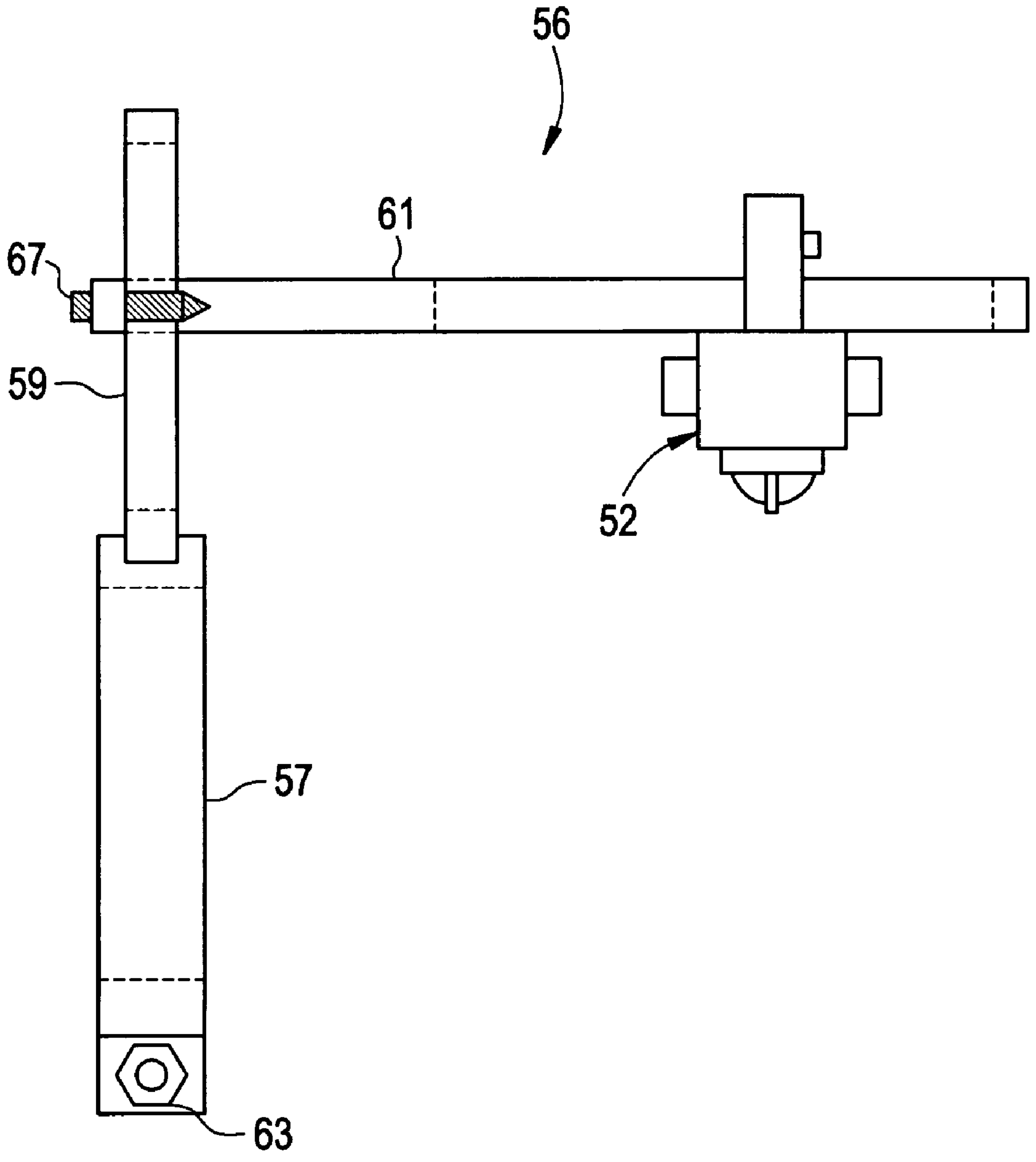
FIGS. 6, 7, and 8 are cross sectional representations of the various members of a support for an atomizing liquid injector.
Figure 7:
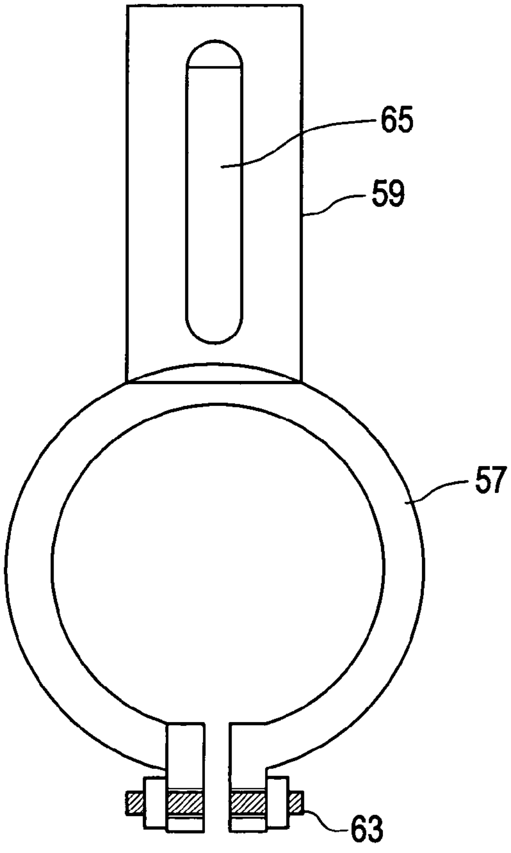
Figure 8:
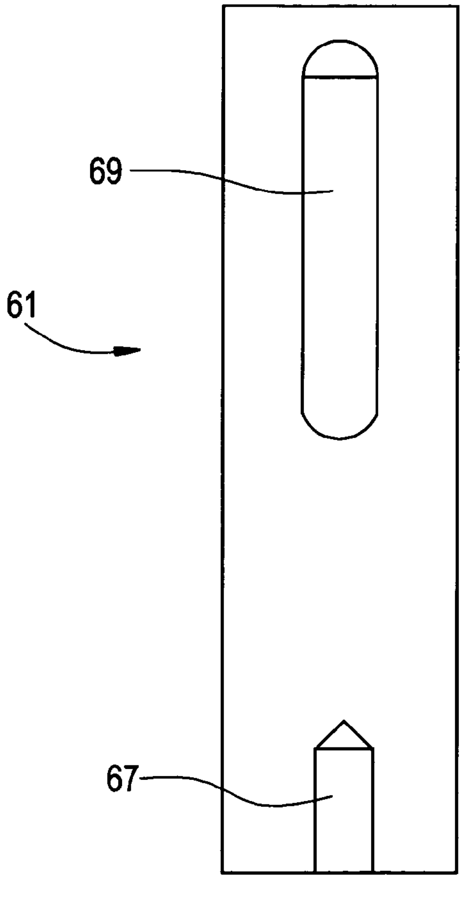

Referring now to FIGS. 6, 7, and 8, support 56 is shown. Support 56 is adjustable in both the vertical and horizontal directions to facilitate the positioning of atomizing liquid injector 52 at the flame. Support 56 comprises a clip 57 disposed at the anode nozzle of the plasma gun, a first arm 59 extending from clip 57, and a second arm 61 extending from first arm 59. Clip 57 comprises a fastener 63 (e.g., a bolt/nut assembly) to secure support 56 at the anode nozzle. First arm 59 is preferably oriented so as to extend from second arm 61 at a right angle. Each arm 59, 61 includes an opening or channel disposed longitudinally therein. Opening 65 or channel in first arm 59 is configured to slidingly accommodate a pin 67 or similar device disposed at second arm 61 that can be secured to retain second arm 61 at first arm. Opening 69 or channel in second arm 61 is configured to slidingly accommodate a pin (not shown) or similar device disposed at atomizing liquid injector 52. Alternately, arms 59, 61 may be particularly disposed at each other and at clip 57 so as to be variably positionable relative to the anode nozzle of the plasma gun. In either embodiment, support 56 provides for the omni-directional adjustment of atomizing liquid injector 52 such that any configuration of substrate surfaces (e.g., planar, concave, convex, inner diameters, and the like) can be sprayed. Alternatively, a multi-axis microstage with a controller can be used for the fixture of the liquid injector.

Figure 9:
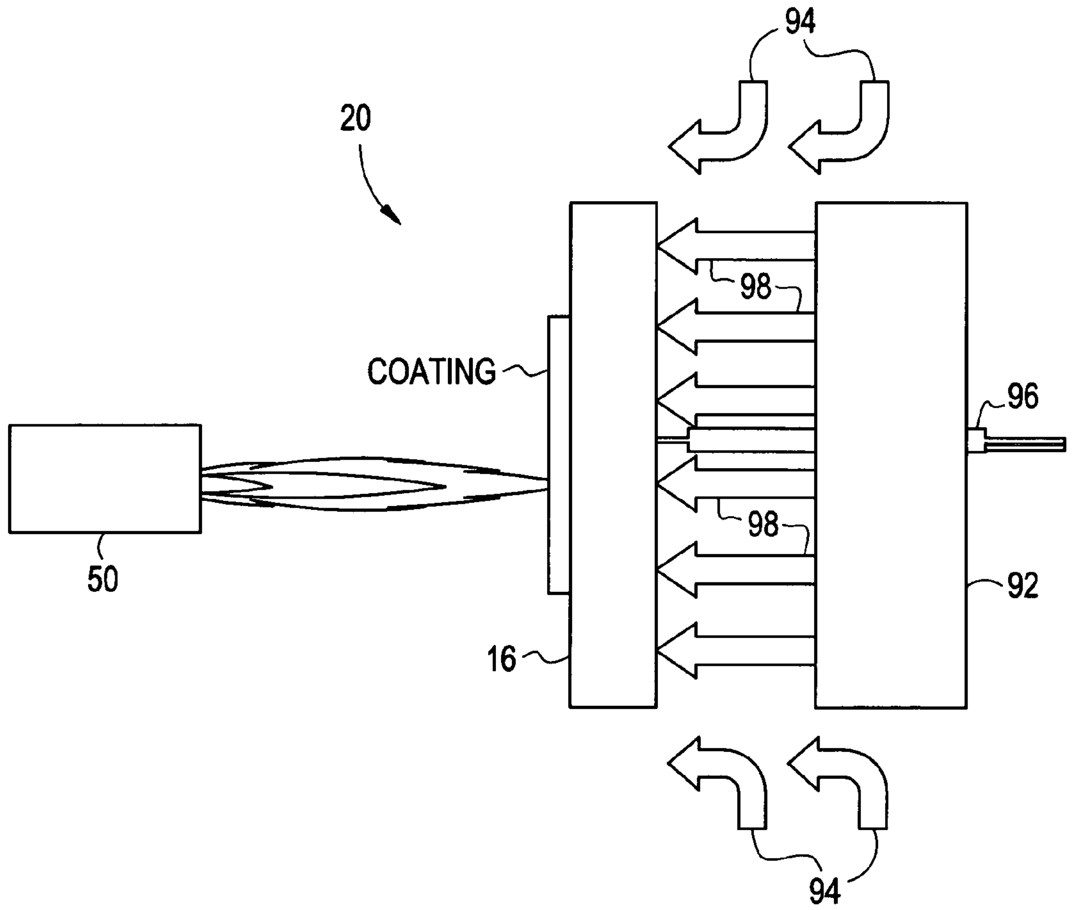
FIG. 9 is a schematic representation of a substrate thermal management system of an apparatus for a plasma spray operation.

Referring now to FIG. 9, substrate thermal management system 20 is shown in greater detail. Substrate thermal management system 20 provides for the thermal control of the target substrate 16 prior to the thermal spray operation and maintains a pre-selected substrate temperature during the spraying operation. To effect the proper deposition of the coating while maintaining the microstructure of the coating material, substrate 16 is preferably preheated (as indicated by arrows 98) to a temperature of about 150 degrees C. to about 1,000 degrees C. and more preferably about 200 degrees C. to about 700 degrees C. Substrate thermal management system 20 comprises at least one heat source 92 capable of raising the temperature of substrate 16 to the desired temperature, a coolant source 94, and temperature monitoring devices 96. Heat source 92 provides for the heating of substrate 16. Exemplary embodiments of heat sources that may be utilized include, but are not limited to, quartz heaters, electric- or gas-powered plates at which substrate 16 may be mounted, hot air, radio frequency, microwaves, and the like. The flame generated from thermal spray gun 50 may also be utilized to heat substrate 16.

The coolant source provides a coolant stream (as indicated by arrows 94) that prevents substrate 16 from overheating during the substrate preheating step or during the spray operation itself. Exemplary embodiments of coolant sources include, but are not limited to, configurations of coils through which liquids (e.g., liquids such as water, brines, refrigerants, oils, and the like) or gases may be directed, jets of air or other gases, and water spray.

Temperature monitoring devices 96 are utilized to determine the temperatures at all surfaces of substrate 16. Preferably, temperature monitoring devices 96 comprise thermocouples disposed in intimate contact with the surfaces of substrate 16 at the sides and back of substrate 16, and an optical temperature measurement device (e.g., an optical pyrometer) for the measurement of temperature near the point at which the flame contacts substrate 16. Temperature monitoring devices 96 are preferably disposed in controllable communication with the control system.

The apparatus for the thermal spray of precursor solutions onto the temperature controlled substrate provides several advantages over similar apparati operated under similar regimes. First, due to the incorporation of multiple reservoirs into the apparatus, continuous and constant liquid delivery of the solution can be attained. By alternating the feeds from at least two reservoirs, a coating can be applied without interruption of the liquid feed to the plasma spray. The use of multiple solutions and premixing of those solutions also allows for the formation of multi-component coatings or doped coatings having enhanced chemical uniformity.

Second, because of the ability to purge liquid, typically-water through the liquid injector system 52 and particularly the injector nozzle, blockages in the various flow paths of the apparatus can be minimized or avoided. Thus, efficient operation of the apparatus can be maintained with little or no corrosion problems or clogging of the flow paths. Furthermore, opportunities for contamination, particularly subsequent to sequential feed operations of multiple solutions for multi-layer coatings, are minimized.

Third, because of the temperature control of the target substrate to the temperatures described above, together with control of the precursor solution flowrate and thermal spray flame temperature, the desired microstructures can be obtained in the applied coating. In particular, the relevant mechanisms characteristic of the physical and chemical conversion of the precursor in the flame and at the substrate allows for repeatable and consistent coating chemistries and microstructure. Furthermore, the atomization of the delivered precursor solution at the micro-scale, and control of the atomized liquid spray pattern provides for a better penetration of liquid feed into the plasma flame, thereby resulting in a high deposition rate, good adhesion of the coating on the substrate, and a uniformly thick coating. Use of multiple liquid injectors 52 further enhance deposition rates.

Furthermore, the apparatus as described above embodies the advantages of long-term and non-stop plasma spraying of precursor solutions to achieve thick coatings, bulk forms, or coatings for large dimension engineering applications. Moreover, because the apparatus comprises various components connected by lines, the apparatus can be readily assembled and disassembled, thus imparting a portability aspect to the apparatus.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An apparatus for the thermal spray delivery of a solution, said apparatus comprising:

a first solution reservoir;

a second solution reservoir;

a singular or multiple liquid injector(s) disposed in fluid communication with said reservoirs;

a flame source configured to direct a thermal spray from said liquid injector(s) to a substrate, wherein said thermal spray from said liquid injector(s) comprises at least partially melted particles and a non-liquid material;

a thermal control device disposed in thermal communication with said substrate; and a chamber enclosing the thermal spray flame source and substrate which facilitates use of inert gas blanketing.

2. The apparatus of claim 1, further comprising control valves disposed at respective outlets of said reservoirs.

3. The apparatus of claim 1, further comprising a mixer disposed at an outlet junction of said reservoirs.

4. The apparatus of claim 1, wherein said reservoirs are disposed in fluid communication with each other.

5. The apparatus of claim 1, wherein said reservoirs are pressurizable to provide a driving force for a solution disposed therein.

6. The apparatus of claim 5, wherein said reservoirs are pressurizable with a gas selected from the group of gases consisting of air, nitrogen, argon, and helium.

7. The apparatus of claim 5, wherein said reservoirs are pressurizable to about 5 psi to about 80 psi.

8. The apparatus of claim 5, wherein said reservoirs are pressurizable to about 20 psi to about 50 psi.

9. The apparatus of claim 1, wherein said liquid injector(s) comprise(s), a solution channel from which said solution is received from said reservoirs, an injector nozzle axially disposed at said solution channel, and an atomizing gas chamber fed by said injector nozzle; and an air cap injection nozzle configured to control atomized liquid precursor spray pattern.

10. The apparatus of claim 9, wherein said air cap injection nozzle comprises:

an outlet opening having an orientation selected from the group of orientations consisting of angular openings, elliptical openings, round openings, and combinations of the foregoing openings; and a configuration which precludes nozzle tip fouling.

11. The apparatus of claim 10, wherein said cap comprises a planar face perpendicularly oriented relative to a direction of flow from said outlet of said injector nozzle.

12. The apparatus of claim 9, wherein an atomizing gas is received through said atomizing gas channel at a pressure of about 5 psi to about 80 psi.

13. The apparatus of claim 9, wherein an atomizing gas is received through said atomizing gas channel at a pressure of about 20 psi to about 50 psi.

14. The apparatus of claim 9, further comprising a cleaning assembly disposed in fluid communication with said solution channel.

15. The apparatus of claim 14, wherein said cleaning assembly comprises, a pin disposed in said solution channel, an air inlet disposed at said solution channel, a control valve disposed in fluid communication with said air inlet, and a timer disposed in communication with said control valve.

16. The apparatus of claim 1, wherein said liquid injector comprises:

a solution channel from which said solution is received from said reservoirs, an injector nozzle axially disposed at said solution channel, and a pressured gas or mechanical or electric force driven injection nozzle to generate a precursor spray stream and pattern.

17. The apparatus of claim 1, further comprising a liquid injector cooling and purging system disposed in fluid communication with said atomizing liquid injector, said liquid injector cooling and purging system comprising, an inlet through which a fluid is received, an outlet through which said fluid is delivered to said atomizing liquid injector, and a control valve configured to control the flow of said fluid.

18. The apparatus of claim 1, wherein said substrate thermal management system comprises, a heat source, a coolant source, and temperature monitoring devices.

* * * * *